(12) United States Patent
Christenson

(10) Patent No.: US 7,093,059 B2
(45) Date of Patent: Aug. 15, 2006

(54) READ-WRITE SWITCHING METHOD FOR A MEMORY CONTROLLER

(75) Inventor: Bruce A. Christenson, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 10/335,485

(22) Filed: Dec. 31, 2002

(65) Prior Publication Data

US 2004/0128428 A1 Jul. 1, 2004

(51) Int. Cl.
*G06F 12/02* (2006.01)
*G11C 8/12* (2006.01)

(52) U.S. Cl. .......................... 711/5; 711/157; 711/167; 711/169

(58) Field of Classification Search ................. 711/5, 711/105, 151, 157–158; 710/54, 310; 365/230.03
See application file for complete search history.

(56) References Cited

U.S. PATENT DOCUMENTS

| | | | |
|---|---|---|---|
| 4,688,188 A | 8/1987 | Washington | 364/900 |
| 5,379,379 A | 1/1995 | Becker et al. | 395/250 |
| 5,784,582 A * | 7/1998 | Hughes | 710/117 |
| 5,948,081 A | 9/1999 | Foster | 710/40 |
| 6,216,178 B1 | 4/2001 | Stracovsky et al. | 710/6 |
| 6,233,661 B1 * | 5/2001 | Jones et al. | 711/154 |
| 6,389,520 B1 * | 5/2002 | Christenson | 711/157 |
| 6,393,512 B1 * | 5/2002 | Chen et al. | 711/5 |
| 6,393,534 B1 * | 5/2002 | Chen et al. | 711/158 |
| 6,507,886 B1 * | 1/2003 | Chen et al. | 711/5 |
| 6,622,225 B1 * | 9/2003 | Kessler et al. | 711/158 |
| 6,662,265 B1 * | 12/2003 | Kessler et al. | 711/105 |
| 2001/0013082 A1 | 8/2001 | Jeddeloh | 711/105 |
| 2004/0073767 A1 * | 4/2004 | Johnson et al. | 711/202 |
| 2004/0076044 A1 * | 4/2004 | Nowshadi | 365/200 |
| 2005/0091460 A1 * | 4/2005 | Rotithor et al. | 711/158 |

FOREIGN PATENT DOCUMENTS

| EP | 0 843 262 A2 | 5/1998 |
|---|---|---|
| EP | 0 843 262 A3 | 5/1998 |

OTHER PUBLICATIONS

PCT International Search Report, Aug. 24, 2004 based on International Application No. PCT/US 03/39155.
PCT Search Report for corresponding PCT application performed by European Patent Office dated Aug. 24, 2004.

* cited by examiner

*Primary Examiner*—Donald Sparks
*Assistant Examiner*—Jesse Diller
(74) *Attorney, Agent, or Firm*—Pillsbury Winthrop Shaw Pittman LLP

(57) ABSTRACT

A system includes a memory device. The memory device has a first bank and a second bank. A memory controller has a write request queue to store write requests. When a read bank conflict exists between a first read request to the first bank and a second read request to the first bank, a first write request is executed to the second bank during a delay. The delay takes place after the first read request is executed and before the second read request is executed.

27 Claims, 7 Drawing Sheets

READ-WRITE SWITCHING METHOD FOR A MEMORY CONTROLLER

BACKGROUND

1. Technical Field

Embodiments of this invention relate to the field of memory controllers to read and write to a memory.

2. Description of the Related Arts

Current Double Data Rate ("DDR") and Double Date Rate-II ("DDR-II") Dynamic Random Access Memory (DRAM) subsystems exhibit significant latency when performing back-to-back reads to the same bank in memory. Several server chipsets can operate within a single rank of memory, providing a total of 4 independent memory banks. The probability of random traffic hitting the same bank repeatedly in such configuration is 1:4 (25%). In the case of page empty accesses (which are typical in server chipsets), the total bank conflict time is the total of the "activate to read" (tRCD) latency plus the "read to pre-charge" (tRPD) latency plus the "pre-charge" to "activate" (tRP) latency, or the "activate to activate command period" (tRC), whichever timing constraint is longer. In the case of DDR-266, Intel DDR-266 JEDEC Specification Addendum, Rev. 09, published Aug. 14, 2001, this bank conflict duration is typically 65 ns. In the case of DDR-II-533, published Jun. 25, 2001, this bank conflict duration is typically 60 ns. In contrast, the total data latency for a burst of 4 (32 bytes) for each memory technology is only 15 ns and 7.5 ns, respectively.

Traditional read-write switching methods prioritize read requests until the write requests queue up to a preset threshold. Then, an amount of write requests are "drained" back-to-back, and priority returns to the read requests (which are queued while waiting for the writes to drain). However, such read-write switching methods are slow and inefficient because no additional reads or writes are executed during the bank conflict duration.

DETAILED DESCRIPTION

An embodiment of the invention may be utilized to more quickly service write requests in DRAM memory channels. A memory device may queue write requests to memory. When consecutive reads from the memory are to the same rank, same bank, but different pages, a "memory bank conflict" exists and a latency occurs between activate commands to the bank. While reads are scheduled, write requests may queue in a write request queue. If there is a conflict (i.e., there are consecutive reads, and the second read is to the same rank, same bank, but different page), a write operation may occur to a different bank within the same rank while the page for the read action is waiting to be activated. Depending on the time necessary for the activation of a row, additional writes may be implemented on other banks within the same rank. Such method may result in faster execution of write commands, and quicker performance of the DRAM memory device.

Alternatively, the memory device may queue read commands while writes are being executed. The read commands may be queued while the write commands are executed. Once a bank conflict occurs (i.e., two consecutive writes to the same bank in the same rank, but different pages), the read may be executed while the next page is activated. Accordingly, the DRAM may more efficiently service read and write operations.

Figure 1:
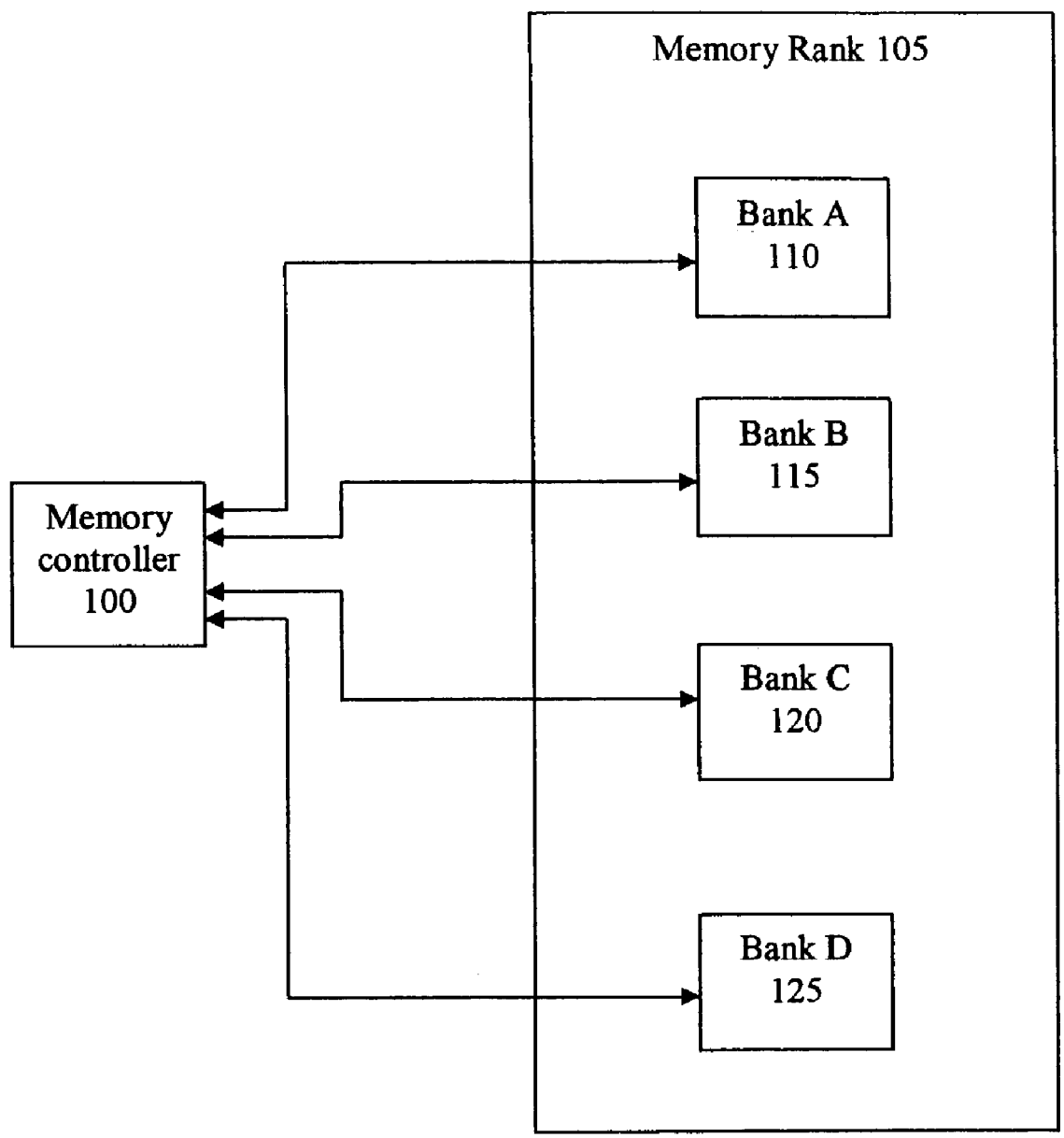
FIG. 1 illustrates a memory system according to an embodiment of the invention.

FIG. 1 illustrates a memory system according to an embodiment of the invention. The memory system may include a memory controller 100 and a memory rank 105. The memory rank 105 may include several memory banks, such as bank A 110, bank B 115, bank C 120, and bank D 125. The memory controller 100 may be in communication with each of bank A 110, bank B 115, bank C 120, and bank D 125. Although only a single memory rank 105 is shown in FIG. 1, multiple memory ranks may also be utilized. Each bank may include an array having a plurality of pages (i.e., rows) and columns of storage locations. Data may be read from or written to a location in the array by activating a specific page. Then, data may be read from locations within the page. To read data from a different page, the different page may be precharged and then activated after the data is read from the first page.

Figure 2:
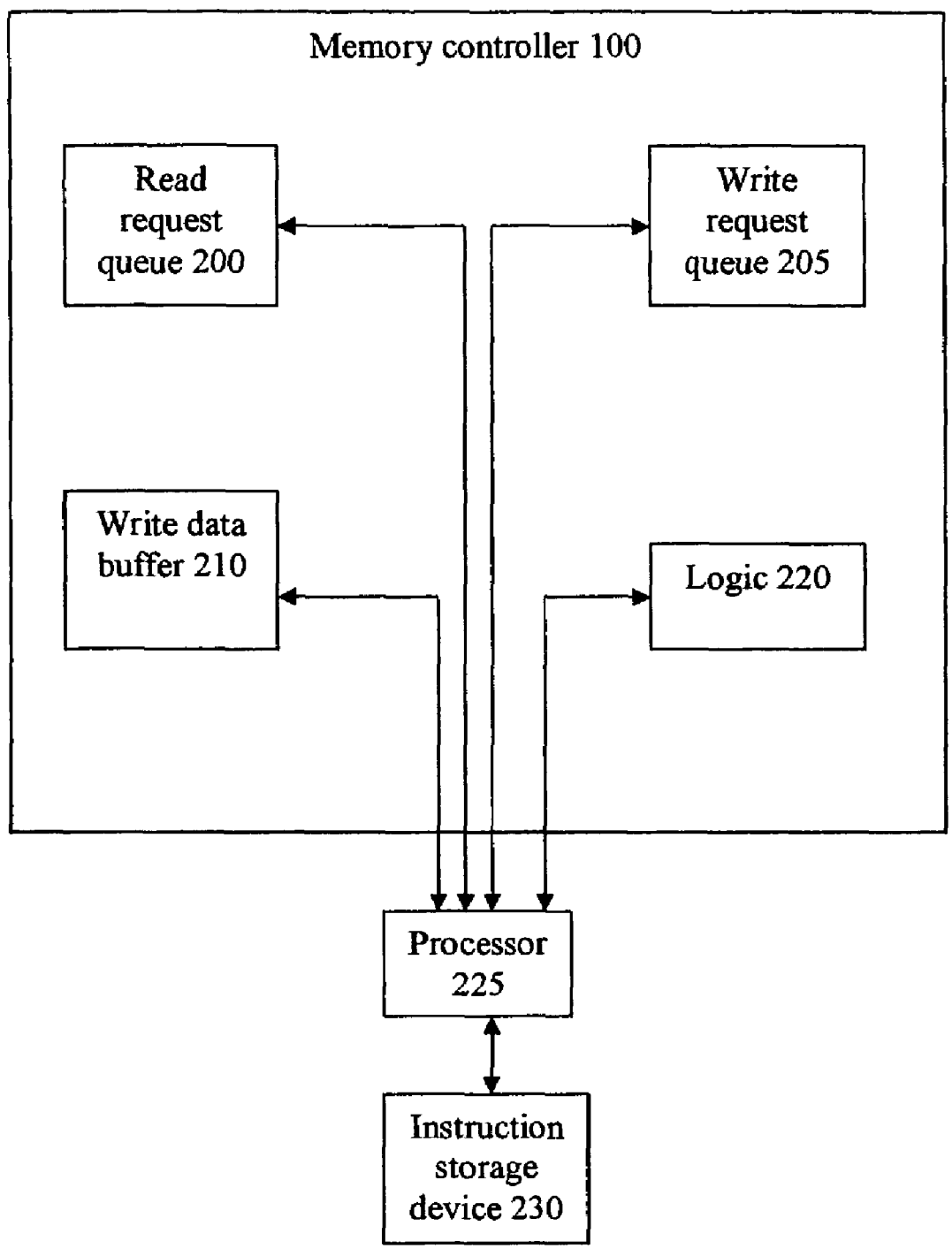
FIG. 2 illustrates a memory controller according to an embodiment of the invention.

FIG. 2 illustrates a memory controller 100 according to an embodiment of the invention. The memory controller 100 may include a read request queue 200. The read request queue 200 may be utilized to queue read requests when reads are currently being made, as well as when writes are being made. The memory controller 100 may also include a write request queue 205 which may be also utilized to queue write requests when reads are currently being made, as well as when writes are being made.

The memory controller 100 may also include a write data buffer 210, which may cache data to be written in a coherent and/or consistent manner. The write data buffer 210 may store write data that has not yet been written to memory. The write data buffer 210 may be one entry deep, but is typically more than one entry deep, for performance reasons. If a read request following an earlier write request to the same memory address enters the memory controller 100, the memory controller 100 may either service the read request using the data from the write data buffer 210, or it may schedule the write request and then schedule the read request.

The memory controller 100 may include logic 220. The logic 220 may be utilized to determine whether the next pending read command has a protocol conflict with a previously scheduled command. A protocol conflict may be a condition in which a DRAM timing constraint prohibits the memory controller 100 from scheduling a DRAM command in the current clock cycle. Protocol conflicts include bank conflicts, where back to back accesses to the same rank, bank, different page are delayed a specific amount of time between active commands (due to tRC DRAM timing constraints).

The memory controller 100 may be in communication with a processor 225 to control each of the read request queue 200, the write request queue 205, the write data buffer 210, and the logic 220. The processor 225 may, in turn, be in communication with an instruction storage device 230. The instruction storage device 230 may contain instructions (e.g., program code) that are executable by the processor 225.

The memory controller 100 may cause writes to be executed during the latency caused by bank conflicts. The memory controller 100 may cause the oldest queued write to be scheduled during a bank conflict, provided it does not conflict with the current read operation.

Figure 3:
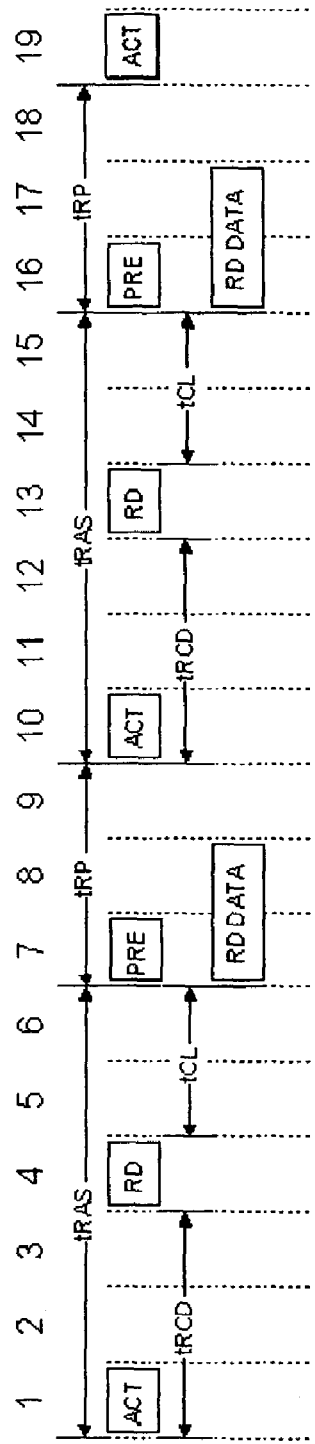
FIG. 3 illustrates a timing diagram according to an embodiment of the invention.

FIG. 3 illustrates a timing diagram according to an embodiment of the invention. The scale at the top of the diagram represents time. Each of the numerical units may represent 10 ns, for example. "ACT" represents an activate command. When a page is selected from which to be read, the page may be activated by the "ACT" command. As illustrated, the "ACT" command may take 3 time units for the page to become activated. This activation latency is represented by time delay "tRCD" (tROD is an abbreviation for "time to activate for the read command"). Next, a read command (shown as "RD") may be executed. The RD command may take 1 time unit to be executed, and then an additional 2 time units until the data is actually read. This latency is represented by the time delay "tCL" ("tCL" may stand for "time for CAS latency," where "GAS" is an abbreviation for "column access strobe"). The entire time from when the page is activated until data can be read is represented by the time delay "tRAS," which is the sum of the read command RD and the tRCD and tCL timing constraints, and is shown as taking 6 time units.

Next, a precharge instruction ("PRE") is executed, and the data is read (shown as "RD DATA" on the timing diagram) from the previous RD instruction. The precharge process may take 3 time units, shown as time "tRP" (abbreviation for the precharge command duration). The precharge ("PRE") command de-activates a page in a bank. This must happen before another page in the same bank has been activated with the activate ("ACT") command. If the page is not precharged, then the next access to that bank will either be a page hit (same rank, bank, page) or a page miss (same rank, bank, different page). Page hits require only the "RD" command. Page misses require a "PRE", an "ACT", and then a "RD". If a page is precharged, the next time that bank is accessed (which may be some much later time) then the next access will be a page empty access, which requires only an "ACT" and then a "RD".

Next, if data is to be read from a different page within the same bank, an additional tRC delay is encountered. The ACT and RD commands may again be executed, and a time period of an additional 6 time units may elapse before the data from the next page may be read. An additional PRE command may then be executed, etc.

Accordingly, as shown, a significant latency shown by the time period tRCD is present when consecutive reads are made from different pages within the same bank (the tRCD period would not be present if consecutive reads were made from the same page of the same bank and rank). The memory controller 100 may take advantage of this tRCD latency by executing write instructions during this time period, resulting in more efficient and faster scheduling of write commands.

Figure 4:
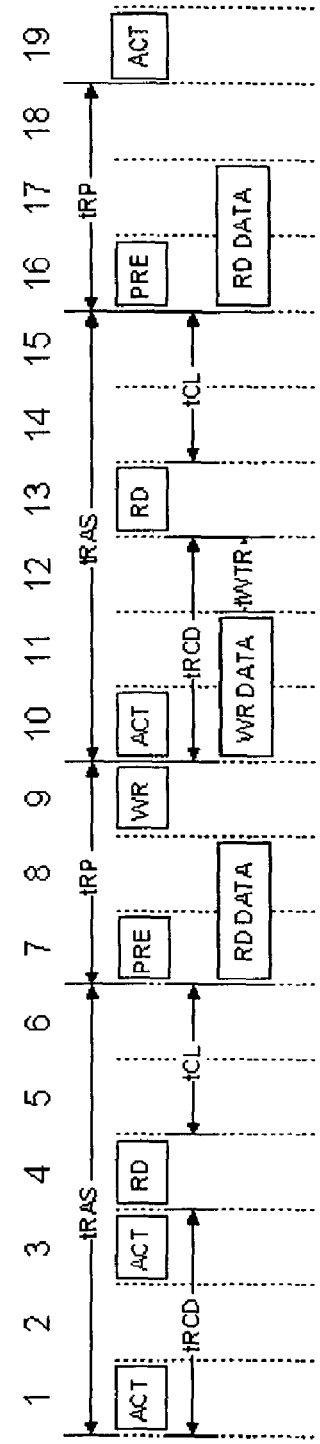
FIG. 4 illustrates a timing diagram of read operations having a bank conflict when a write operation is executed within the same rank according to an embodiment of the invention.

FIG. 4 illustrates a timing diagram of read operations having a bank conflict when a write operation is executed within the same rank according to an embodiment of the invention. As shown, the read commands and time delays are the same as those shown in FIG. 3. However, in the timing diagram of FIG. 4, the memory controller 100 takes advantage of the tRCD latency by writing data to a different memory bank within the same rank. For example, if a read operation is to a page within bank A 110 of the memory rank 105, a write operation may be made to one of the other banks (e.g., bank B 115, bank C 120, or bank D 125, but not bank A 110) during the tRAS time period.

A write command ("WR") may be executed during the tRP time period during the precharge operation, and the data may actually be written ("WR DATA") during the next tRCD time period tWTR is called the "write to read command delay" and the delay constraint must be satisfied if there is a read after a write to the same rank. This is why it is better for a memory controller 100 to schedule the last write to a different rank than the subsequent read. Accordingly, a WR command may be executed and data be written to another bank without adversely affecting execution of the RD command.

Figure 5:
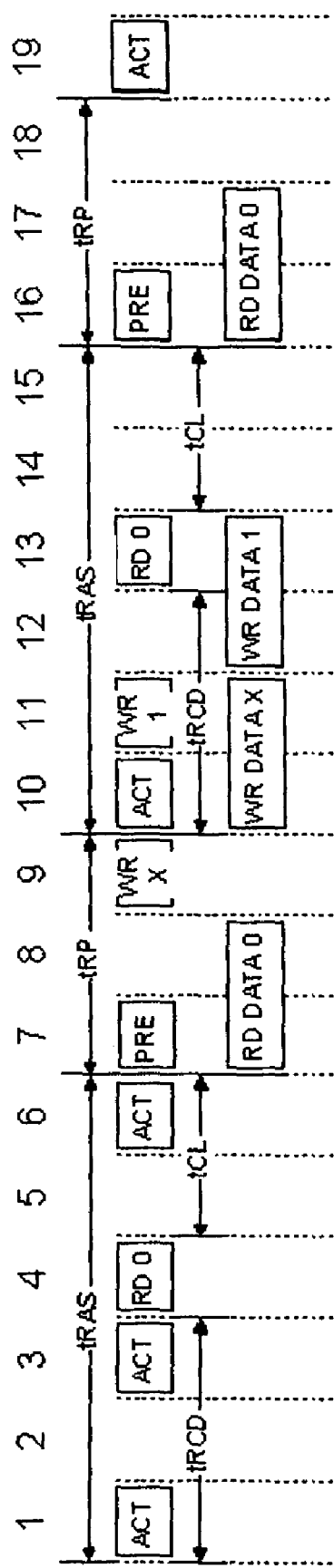
FIG. 5 illustrates a timing diagram of read operations having a bank conflict when multiple write operations are executed within the different ranks according to an embodiment of the invention.

FIG. 5 illustrates a timing diagram of read operations having a bank conflict when multiple write operations are executed within different ranks according to an embodiment of the invention. As shown, write operations may be executed to write data to banks in different ranks. To avoid impacting the latency of the second read because of the tWTR delay, the final write transaction would need to target a different rank, than the second read. As shown, data may be read from a bank within rank "0." During the tRCD time period, data may first be written to a memory bank within rank "X", and then data may be written to a memory bank within rank "1." As shown, the WR command to write data to the memory bank with rank "X" may be executed at the end of the tRP period. Then, while the data is actually written to the memory bank, the write command WR1 may be executed, and then data may be written to the memory bank within rank "1." Accordingly, two write operations may be executed without adversely affecting the RD operation.

Other embodiments may execute two writes to the same rank interleaved between two reads with a bank conflict, and five or six writes (depending on the technology protocol timings) may be interleaved between two reads with a bank conflict, provided the last three write commands are to different ranks than the read commands. If the tRCD timing constraint remains constant, but the DRAM clock period increases (i.e., clocks faster), then the number of transactions that can be scheduled during a bank conflict (tRCD) can be increased from 1 or 2 to many more. How many can be scheduled without impacting the latency of the second original transaction may be determined by the specific DRAM device timing parameters being used in the system.

Figure 6:
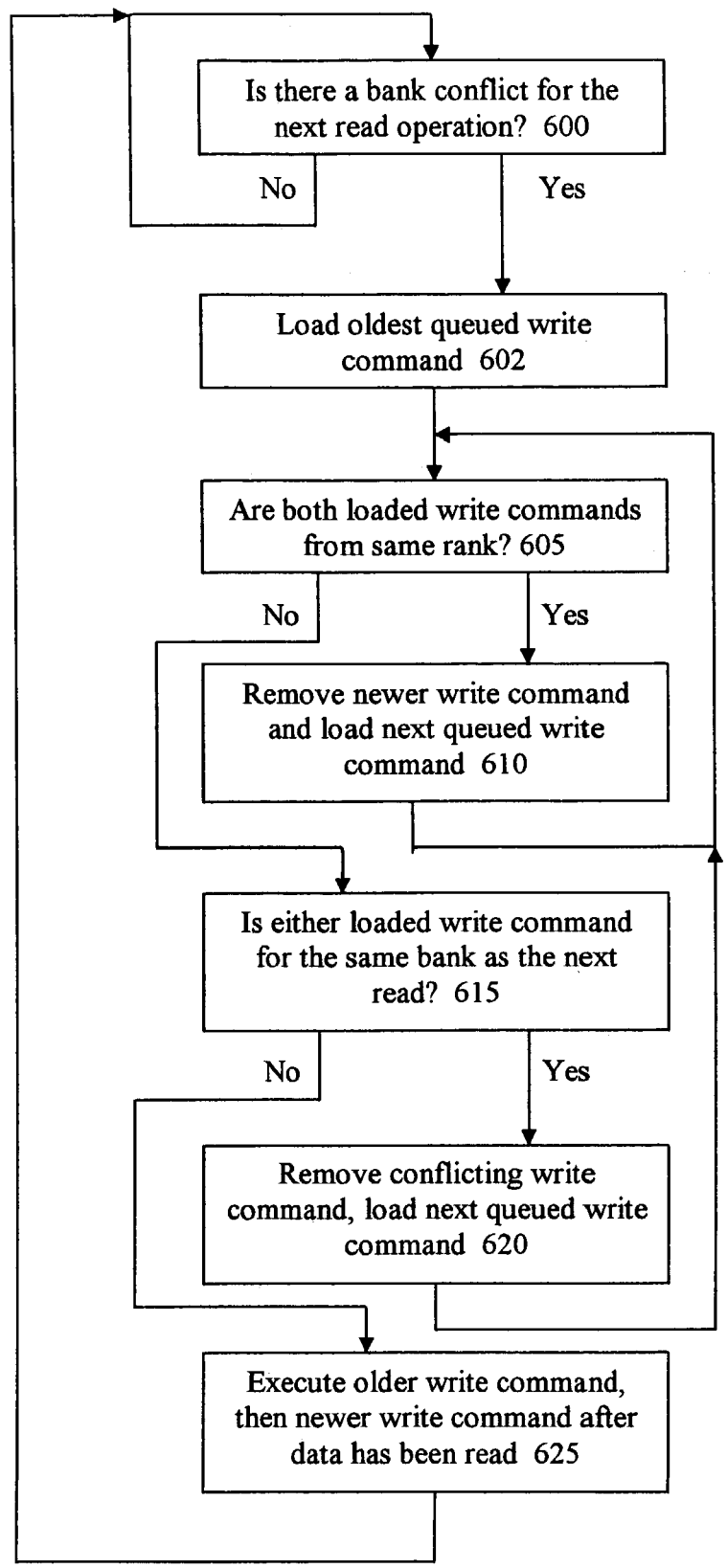
FIG. 6 illustrates a method of executing multiple write commands when there is a read bank conflict according to an embodiment of the invention.

FIG. 6 illustrates a method of executing multiple write commands when there is a read bank conflict according to an embodiment of the invention. First, the system may determine 600 whether there is a bank conflict for the next read operation. If "no," processing may remain at operation 600. If "yes," processing may proceed to operation 602. At operation 602, the system may load the oldest queued write command from the write request queue 205. The system may then determine 605 whether both loaded write commands are from the same rank. If "no," processing proceeds to operation 615. If "yes," processing proceeds to operation 610, where the newer write command is removed 610 and the next queued write command is loaded. After operation 610, processing may return to operation 605. At operation 615, the system may determine whether either loaded write command is for the same bank as the next read. If "no," processing proceeds to operation 625. If "yes," processing proceeds to operation 620, where the conflicting write command is removed 620, and the next queued write command is loaded. After operation 620, processing may return to operation 605. At operation 625, after the data has been read, the system may execute the older write command first, and then execute the newer write command. In other embodiments, the newer write command may be executed first. In additional embodiments, more than two write commands may be executed during a read operation bank conflict. After operation 625, processing may return to operation 600.

Figure 7A:
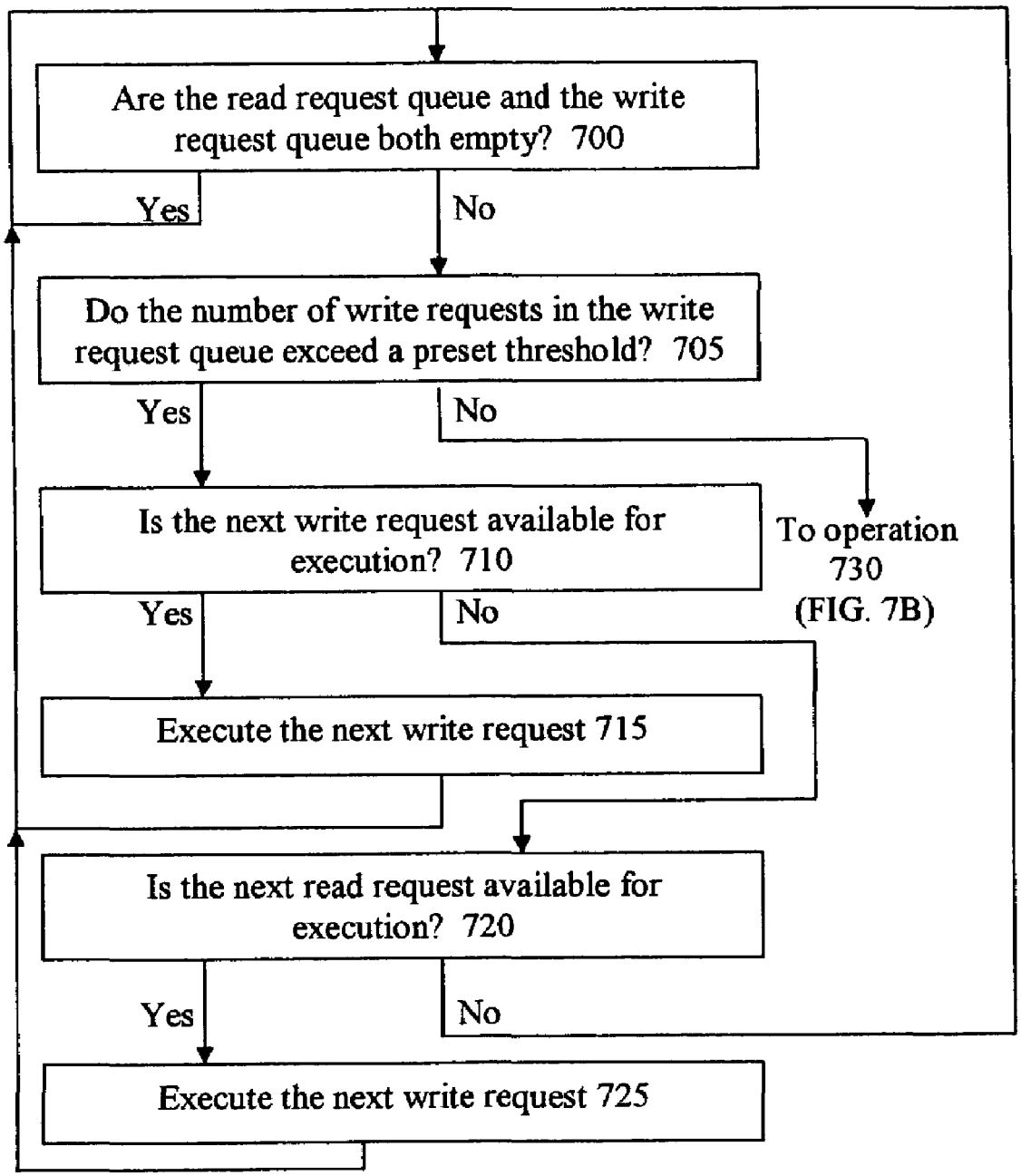
FIG. 7A illustrates a first portion of an additional method of executing write commands according to an embodiment of the invention.

FIG. 7A illustrates a first portion of an additional method of executing write commands according to an embodiment of the invention. As shown, the system may first determine 700 whether the read request queue 200 and the write request queue 205 are both empty. If "yes," processing remains at operation 700. If "no," processing proceeds to operation 705, where the system determines 705 whether the number of write requests in the write request queue 205 exceeds a preset threshold. The system may have a preset threshold for the number of write requests it may store. Once the number of write requests exceeds the threshold level, the system may give priority to executing the write requests and may execute them as soon as possible until the number of queued write requests falls below the threshold. If the answer to operation 705 is "yes," processing proceeds to operation 710. If the answer at operation 705 is "no," processing proceeds to operation 730 shown in FIG. 7B.

At operation 710, the system may determine whether the next write request is available for execution. If "yes," processing proceeds to operation 715. If "no," processing proceeds to operation 720. At operation 715, the system may execute the next write request, and processing may then return to operation 700. At operation 720, the system may determine whether the next read request is available for execution. If "yes," processing proceeds to operation 725. If "no," processing returns to operation 700. Next, at operation 725, the system executes the next write request and processing then returns to operation 700.

Figure 7B:
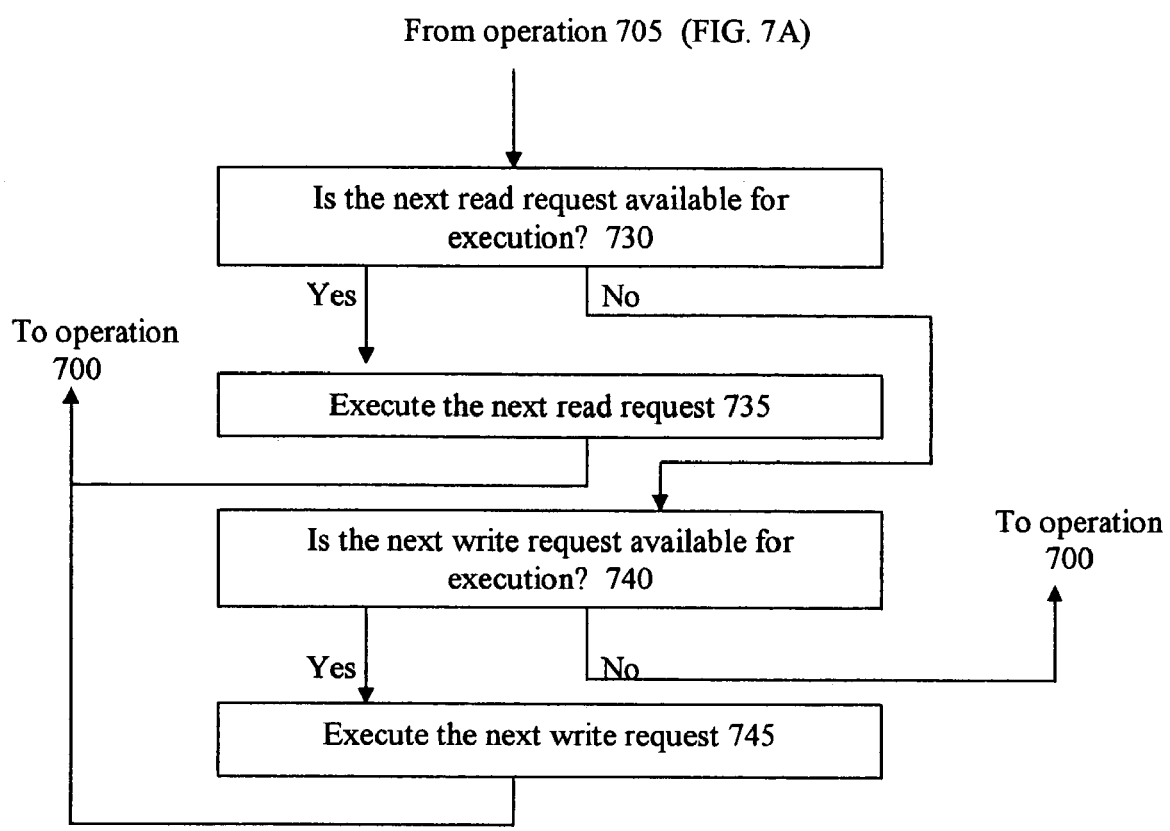
FIG. 7B illustrates a second portion of an additional method of executing write commands according to an embodiment of the invention.

FIG. 7B illustrates a second portion of an additional method of executing write commands according to an embodiment of the invention. At operation 730, the system may determine whether the next read request is available for execution. If "yes," processing proceeds to operation 735. If "no," processing proceeds to operation 740. At operation 735, the system may execute the next read request and then proceed to operation 700. Next, at operation 740, the system may determine whether the next write request is available for execution. If "yes," processing proceeds to operation 745. If "no," processing proceeds to operation 700. At operation 745, the system executes the next write request and then processing returns to operation 700.

While the description above refers to particular embodiments of the present invention, it will be understood that many modifications may be made without departing from the spirit thereof The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A memory system, comprising:
   a memory device having a first bank with a first page and a second page, and a second bank; and
   a memory controller, to begin execution of a first read request to the first bank of the first page, to determine when a read bank conflict exists between the first read request to the first page of the first bank and a second read request to the second page of the first bank, to complete execution of a first write request to the second bank after the data has been read for the first read request but before a second read command included in the second read request is executed, and to complete the second read request to the second page as a next transaction after writing of data for the first write request is executed.

2. The memory system according to claim 1, further including a read request queue to store the first read request and the second read request.

3. The system according to claim 1, further including a write data buffer to store write data associated with the first write request.

4. The system according to claim 1, further including logic to determine if one of the second read request and the first write request has a protocol conflict with the first read request.

5. The system according to claim 1, wherein the memory device is a dynamic random access memory (DRAM).

6. A method, comprising:
   beginning execution of a first read request including a first read command to a first page of a first bank of a memory device;
   determining that a read bank conflict exists between the first read request and a second read request because the second read request is accessing a second page of the first bank of the memory device,
   completing a first write request to a second bank after data has been read for the first read request but before a second read command included in the second read request is executed; and
   completing the second read request to the second page of the first bank after writing of data for the first write request has been completed.

7. The method of claim 6, wherein the first bank and the second bank are within a same rank.

8. The method of claim 6, wherein the first bank is not within a same rank as the second bank.

9. The method of claim 6, further including storing the first write request in a write request queue.

10. The method of claim 6, wherein a write command of the first write request is executed during a time required for a precharge process that deactivates the first page of the first bank.

11. The method of claim 6, wherein the data is written for the first write request during a time required for activation of the second page of the first bank of the memory device.

12. The method of claim 6, further including completing a second write request to a third bank after the data has been read for the first read request and before data has been read for the second read request.

13. The method of claim 12, wherein a write command of the second write request is executed during a time required to activate the second page of the first bank of the memory device.

14. The method of claim 12, wherein data is written for the second read request during a time required for activation of the second page of the first bank and during a time when a read command of the second read request is executed.

15. An article comprising a storage medium having stored thereon instructions that when executed by a machine result in the following:
  beginning execution of a first read request including a first read command to a first page of a first bank of a memory device;
  determining whether a read bank conflict exists between the first read request and a second read request because the second read request is accessing the first bank of the memory device,
  completing a first write request to a second bank after data has been read for the first read request but before a second read command included in the second read request was executed; and
  completing the second read request to a second page of the first bank as a next transaction after writing of the data for the first write request has been completed.

16. The article of claim 15, wherein the first bank and the second bank are within a same rank.

17. The article of claim 15, wherein the first bank is not within a same rank as the second bank.

18. The article of claim 15, wherein the instructions further result in storing the first write request in a write request queue.

19. The article of claim 15, wherein a write command of the first write request is executed during a time required for a precharge process that deactivates the first page of the first bank.

20. The article of claim 15, wherein the data is written for the first write request during a time required for activation of the second page of the first bank of the memory device.

21. The article of claim 15, including instructions which when executed cause a machine to perform the following: completing a second write request to a third bank after the data has been read for the first read request and before data has been read for the second read request.

22. The article of claim 21, wherein a write command of the second write request is executed during a time required to activate the second page of the first bank of the memory device.

23. The method of claim 21, wherein data is written for the second read request during a time required for activation of the second page of the first bank and during a time when a read command of the second read request is executed.

24. A memory controller, comprising:
  a write request queue to store a first write request;
  logic to begin execution of a first read request including a first read command to a first page of a first bank of a memory device, to determine when a read bank conflict exists between the first read request to a first page of the first bank of the memory device and a second read request to a second page of the first bank, to complete a first write request to a second bank of the memory device after data has been read for the first read request but before a second read command included in the second read request is executed, and completing the second read request to the second page of the first bank as a next transaction after writing of data for the first write request has been completed.

25. The memory controller according to claim 24, further including a read request queue to store the first read request and the second read request.

26. The memory controller according to claim 24, further including a write data buffer to store the data for the first write request.

27. The system according to claim 24, wherein the memory device is a dynamic random access memory (DRAM).

* * * * *